INVENTORS
ARNOLD PITT
TADEUSZ BUDZICH
BY- Maybee & Legris
ATTORNEYS

INVENTORS
ARNOLD PITT
TADEUSZ BUDZICH

June 18, 1963

A. PITT ET AL 3,093,946

LOAD RESPONSIVE CONTROL FOR POWER SYSTEMS

Filed Oct. 8, 1959

INVENTORS
ARNOLD PITT
TADEUSZ BUDZICH

BY Maybee & Legris
ATTORNEYS

United States Patent Office 3,093,946
Patented June 18, 1963

3,093,946
LOAD RESPONSIVE CONTROL FOR
POWER SYSTEMS
Arnold Pitt, 5 Hillgarden Road, Weston, Ontario, Canada, and Tadeusz Budzich, 3344 Colwyn Road, Cleveland, Ohio
Filed Oct. 8, 1959, Ser. No. 845,234
12 Claims. (Cl. 56—20)

This invention relates to a machine having a tool and a feed mechanism for feeding material to said tool, and is specifically concerned with a control for maintaining the load imposed on the tool constant irrespective of changes in the physical characteristics of the material constituting the load.

The invention has particular application in threshing machines where the load imposed on the threshing mechanism constantly varies in dependence on such variables of the crop as density, humidity and the like.

It previously has been proposed, for example, in United States Patent Serial No. 2,639,569 of May 26, 1953, issued in the name of S. F. Pasturczak, to control the ground speed of a threshing machine driven by a constant-speed prime mover in dependence on a combination of the traction load and of the load imposed on the threshing mechanism of the machine by the crop fed to the threshing mechanism.

The structure disclosed in said patent includes a direct drive incorporating a suitable speed-reduction gearing between the prime mover of a machine and the threshing mechanism, and a direct drive incorporating a V-belt infinitely-variable transmission of the movable sheave type between the prime mover and the ground wheels, the step-down ratio of the transmission being directly controlled by a pneumatic mechanism responsive to changes in vacuum encountered in the inlet manifold of the prime mover.

This system, while capable of operating satisfactorily under favourable conditions, is subject to certain disadvantages when required to operate under adverse conditions such as widely varying crop densities, or when the machine is travelling up or downhill.

For example, the power consumed by the threshing mechanism is a minor portion of the total power consumed by the machine as a whole, usually 20–40%, and therefore the sensing of the load at the threshing mechanism as a change in vacuum in the inlet manifold of the prime mover is relatively inaccurate, for the major changes in vacuum encountered are due to the varying power requirements encountered in the propulsion of the machine.

The consequence is that when the machine is travelling downhill the ground speed of the machine will be increased towards maximum regardless of the conditions under which the threshing mechanism is operating. This is due to the fact that the reduction in propulsion power requirements appear as a change in vacuum in the inlet manifold of the prime mover, which change in vacuum cannot be differentiated from a change in vacuum induced in the manifold by a decrease in the load applied to the threshing mechanism. As the power consumed in propulsion is a greater portion of the total power than is the power consumed in the threshing mechanism, it is to be expected that the change in vacuum due to a reduction in propulsion power requirements will be of a major order compared with that produced by a reduction in the load at the threshing mechanism, with the result that a decrease in propulsion load is reflected as a major increase in ground speed and the threshing mechanism may be seriously overfed with crop.

Conversely, when the machine is travelling uphill the ground speed will be reduced towards minimum due to the fact that the prime mover of the machine is operating under an increased propulsion load which cannot be differentiated from an increase in load at the threshing mechanism, and the threshing mechanism may be supplied with too little crop.

Thus, owing to the fact that the ground speed is directly dependent on the total power consumed in threshing and propulsion in these prior art teachings, there can be no constant relationship between the ground speed and the load imposed on the threshing mechanism.

Also, as a change in load at the threshing mechanism must be converted into a change in vacuum in the manifold of the prime mover before any complementary change is made to the ground speed, the time lag between the changes in the variables may result in serious momentary under and overpowering of the threshing mechanism, and also, there is a tendency of the machine to hunt after any change of the variables.

An object of the present invention is to provide a threshing machine in which the ground speed is inversely proportional to the load imposed on the threshing mechanism, irrespective of any changes in load imposed on the prime mover due to varying conditions of traction of the machine.

Another object of the invention is to provide means for maintaining substantially constant a load imposed on a driven tool of the machine by material which is fed to the tool by a driven feed mechanism.

Another object of the invention is to provide a relatively simple control means for a feed mechanism of a machine whereby the speed of operation of the feed mechanism is maintained in inversely proportional relationship to a load imposed on a tool of the machine by material fed to the tool by the feed mechanism.

It will be appreciated that the significant difference between the machine of the present invention and that of the prior art discussed above is that according to the present invention the ground speed or speed of operation of the feed mechanism is proportional exclusively to the load imposed on the threshing mechanism or tool of the machine, whereas in the prior art the ground speed or the speed of the feed mechanism is determined by the total load imposed on the prime mover of the machine.

Accordingly the present invention provides a machine having a driven tool which performs work on material fed to it, a driven feed mechanism for advancing the material and tool relative to each other, and a prime mover for the tool and for the driven feed mechanism, and includes, in combination, a first power transmission and control system comprising a transmission having a constant speed output and interposed between the prime mover and the tool to drive the tool at constant speed, a second power transmission system interposed between the prime mover and the feed mechanism to drive the feed mechanism, a load-sensing device to measure the load on the tool, the load-sensing device producing a control signal to control the driven feed mechanism and hence maintain a substantially constant load on the tool.

According to a further feature of the invention, use is made of a hydraulic pump and a hydraulic motor to provide the power transmission between the prime mover and the tool. The pump is of the "swash-plate" type, the output of the pump being maintained at a constant volumetric flow per unit time by a servo-mechanism responsive to the speed of the prime mover and associated with the output of the pump and connected directly to control the swash-plate angle. Within the power limitations of the prime mover, this volumetric flow is maintained at a constant rate regardless of the resistance to the flow from the pump caused by a load or a variation in the load on the hydraulic motor and the tool, and the pump includes an ancillary control by means of which a determined constant output of the pump may be selected. Hereinafter, and in the claims, the terms "servo-controlled, speed responsive pump" and, in abbreviated form, "servo-pump" will be intended to mean and are to be construed as meaning a pump of the type described above. The specification will include a detailed description of a pump of this kind.

By the term "swatsh-plate pump" is meant a pump including a driven shaft, a cylinder block having bores aligned with the axis of the shaft and which is secured to the shaft for rotation in unison therewith, a piston in each bore and extending from one end of the cylinder block, means biasing the pistons outwardly of the bores, a plate valve common to each of the bores and arranged at the other end of the cylinder block, the plate valve connecting each bore in sequence to a supply of hydraulic fluid and then to a pressure line as the shaft and cylinder block is rotated through one complete revolution, and an annular plate arranged concentrically of the shaft adjacent the outwardly-extending ends of the pistons and having a face which is traversed by said ends of the pistons as the cylinder block is rotated, the annular plate being mounted on trunnions for adjustment about an axis transverse to the axis of the shaft in order that the inclination of the plate may be varied and thus the length of travel of the pistons within their bores and the quantity of hydraulic fluid displaced on each reciprocation be varied, the axis of adjustment of the annular plate being such that each piston is sequentially moved inwardly of its bore to a maximum extent immediately before the respective cylinders are disconnected from the pressure line.

According to a further feature of the invention the pressure sensing device produces a control signal which is operative upon a device to control the feed mechanism in a manner which determines the rate at which material is fed to the tool. Such control signal may be constituted by a servo-mechanism directly associated with a throttle of the prime mover constituting the said device in the case of a variable speed prime mover. In the case of a constant speed prime mover, the device may be an infinitely variable ratio step-down transmission interposed in a drive between the prime mover free mechanism which, in the case of a "combine" threshing machine constitutes the ground wheels of the machine.

Further objects and advantages of the invention will become apparent from a study of the following specification when taken in conjunction with the accompanying drawings, in which.

Figure 1:
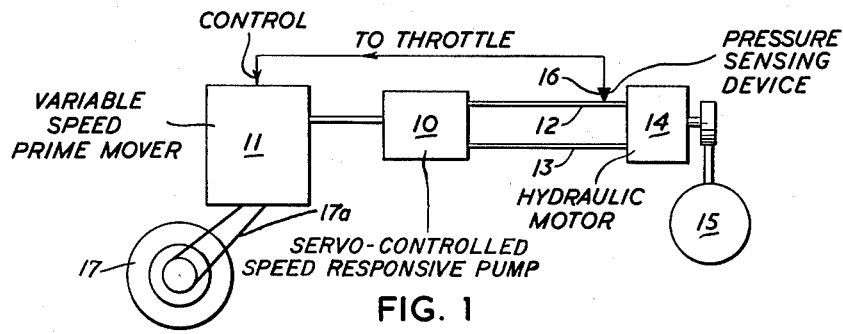
FIGURES 1, 2 and 3 are schematic diagrams showing arrangements according to the invention of machines incorporating controls for accomplishing a constant relationship between the load imposed on a tool of the machine and the rate of feed of material to the tool of the machine by a feed mechanism.

Referring to FIGURE 1, the machine schematically illustrated includes a first power transmission system comprising a servo-controlled speed responsive pump 10 which is of variable capacity and which is provided with servo means to control the capacity in response to the speed of a variable speed prime mover 11 so as to maintain a constant volume output per unit time regardless of the speed of the prime mover. The servo-pump 10 is connected to be driven by the variable speed prime mover 11, and is connected by a supply conduit 12 and a return conduit 13 to drive a fixed displacement hydraulic motor 14. The hydraulic motor 14 is connected to drive a tool 15 of the machine, and, as will be appreciated, as the servo-pump 10 produces a constant volumetric flow per unit time, the hydraulic motor 14 and the tool 15 will be driven at a constant speed within limits determined by the power of the prime mover 11 regardless of changes of load applied to the tool 15 and variations of speed of the prime mover 11. Any variation in the speed of the prime mover is automatically compensated in the servo mechanism of the servo-pump, which is hereinafter described in detail, and any change in load appears as a change in pressure in conduit 12 and is reflected back to the prime mover as a change in power demand. This change in static pressure is sensed by a pressure sensing device, indicated at 16, and produces a control signal which is employed to operate a device constituted by a servo-mechanism associated with a speed control or throttle of the prime mover to decrease the speed of the prime mover in dependence on an increase in pressure sensed in a supply conduit 12.

The prime mover 11 through a second power transmission system 17a also directly drives a feed mechanism 17 for supplying material to the tool 15, the feed mechanism in the case of an agricultural machine such as a thresher being the ground wheels of the machine.

In such a machine, assuming the tool 15 is operating under no load, the static pressure sensed in the supply conduit 12 will be at a minimum, and the prime mover will move the machine at maximum ground speed, and thus provide the maximum feed rate for the feed mechanism 17. As a load is imposed on the tool 15 by material fed to the tool by the feed mechanism 17, the static pressure will rise in the supply conduit 12 and will result in the speed control operating to effect a reduction of speed of the prime mover and also of the feed mechanism. From that point onward any subsequent increase, or decrease, in the load applied to the tool will be sensed as a complementary increase or decrease in static pressure in the supply conduit 12 and will produce a control signal which will be applied to effect a complementary reduction or increase in the speed of the prime mover and of the feed mechanism to maintain the quantity of material fed to the tool, and thus load imposed on the tool, at a determined constant. As the tool is driven by a servo-controlled, speed respective hydraulic pump and hydraulic motor arrangement as described and defined above, the changes in speed of the prime mover are of no consequence within limits determined by the power of the prime mover and by the ability of the servo-control means of the servo-pump 10 to maintain a constant volumetric per unit time output.

Figure 2:
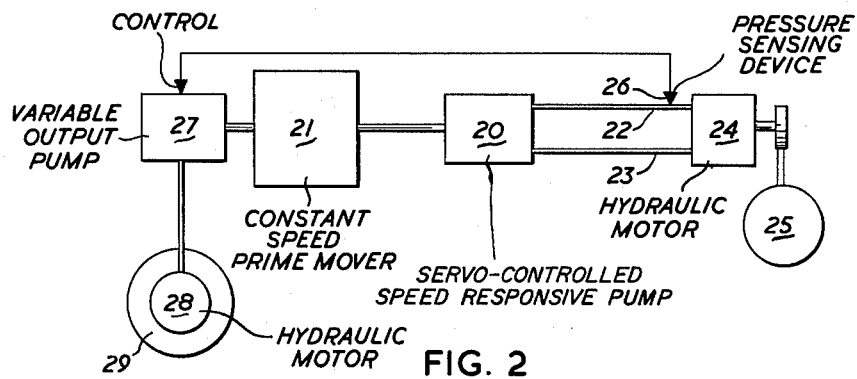

Referring now to FIGURE 2, the machine schematically illustrated includes a first power transmission system comprising a servo-pump 20, identical to servo-pump 10, and which is driven by a constant speed prime mover 21 and which is connected by a supply conduit 22 and a return conduit 23 to drive a fixed displacement hydraulic motor 24, the motor being connected to drive a tool 25. Associated with the supply conduit 22 is a pressure sensing device, indicated at 26, which produces a control signal to control the volumetric output per unit time of a variable output pump 27. The pump 27 constitutes the second power transmission system and is driven by the prime mover 21, and is connected by conduits to drive a hydraulic motor 28 providing a drive for the feed mechanism, indicated diagrammatically at 29 and which in the case of an agricultural machine would be the ground wheels of the machine.

In operation, any increase in load at the tool 25 is sensed as a change in static pressure in the supply conduit 22, and produces the control signal is employed to effect a reduction in the output of the pump 27 and thus to effect a reduction in the speed of operation of the feed mechanism 29.

Figure 3:
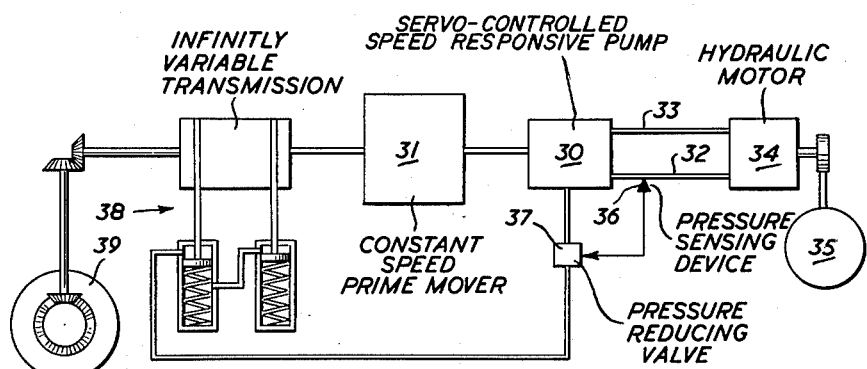

Referring now to FIGURE 3, the machine schematically illustrated includes a first power transmission system comprising servo-pump 30, once again identical to servo-pump 10, and which is driven by a constant speed prime mover 31 and which is connected by a supply conduit 32 and a return conduit 33 to drive a fixed displacement hydraulic motor 34, the motor 34 being connected to drive a tool 35. Associated with the supply line 32 is a pressure sensing device, indicated at 36, which produces a control signal which acts upon a device such as a pressure reducing valve 37 arranged in a hydraulic pressure supply line of a hydraulically-controlled infinitely-variable transmission, indicated generally at 38, incorporated in the second power transmission between the prime mover 31 and a feed mechanism 39. Again, the feed mechanism 39 would be the ground wheels in the case of an agricultural machine.

In operation, any increase in load at the tool 35 is sensed as a change in static pressure in the supply conduit 32, and produces the control signal which is employed to effect a change in the hydraulic pressure supplied to the transmission 38, and which may be used to vary the step-down ratio of the transmission, to effect a complementary reduction in the speed of operation of the feed mechanism 39.

It will be observed that the essence of the invention is identical in the three embodiments of FIGURES 1 to 3 inclusive. In the construction of FIGURE 1 a change in load at the tool is reflected as a direct change in speed of the prime mover and, consequently, of the feed mechanism to maintain the rate of feed and hence the load at the tool at a determined constant. In the construction of FIGURES 2 and 3, a change in load at the tool is sensed and used to directly change the rate at which the feed mechanism supplies material to the tool to maintain the load at the tool at a determined constant.

In each of these three constructions described above, the power variations encountered in the feed mechanism, i.e., in the propulsion of the machine where the machine transverses the material to effect the feed, is ineffective to override the control of the feed mechanism imposed by the sensing of the load at the tool. Any increase or decrease in propulsion power requirements may be met without producing a change in the rate of feed of the feed mechanism. A change in load at the tool is immediately sensed and acts on the feed mechanism which is under the direct and exclusive control of the load sensed at the tool. Thus the rate of feed of the feed mechanism is maintained in determined relationship to the load sensed at the tool irrespective of changes in propulsion power requirements.

Figure 4:
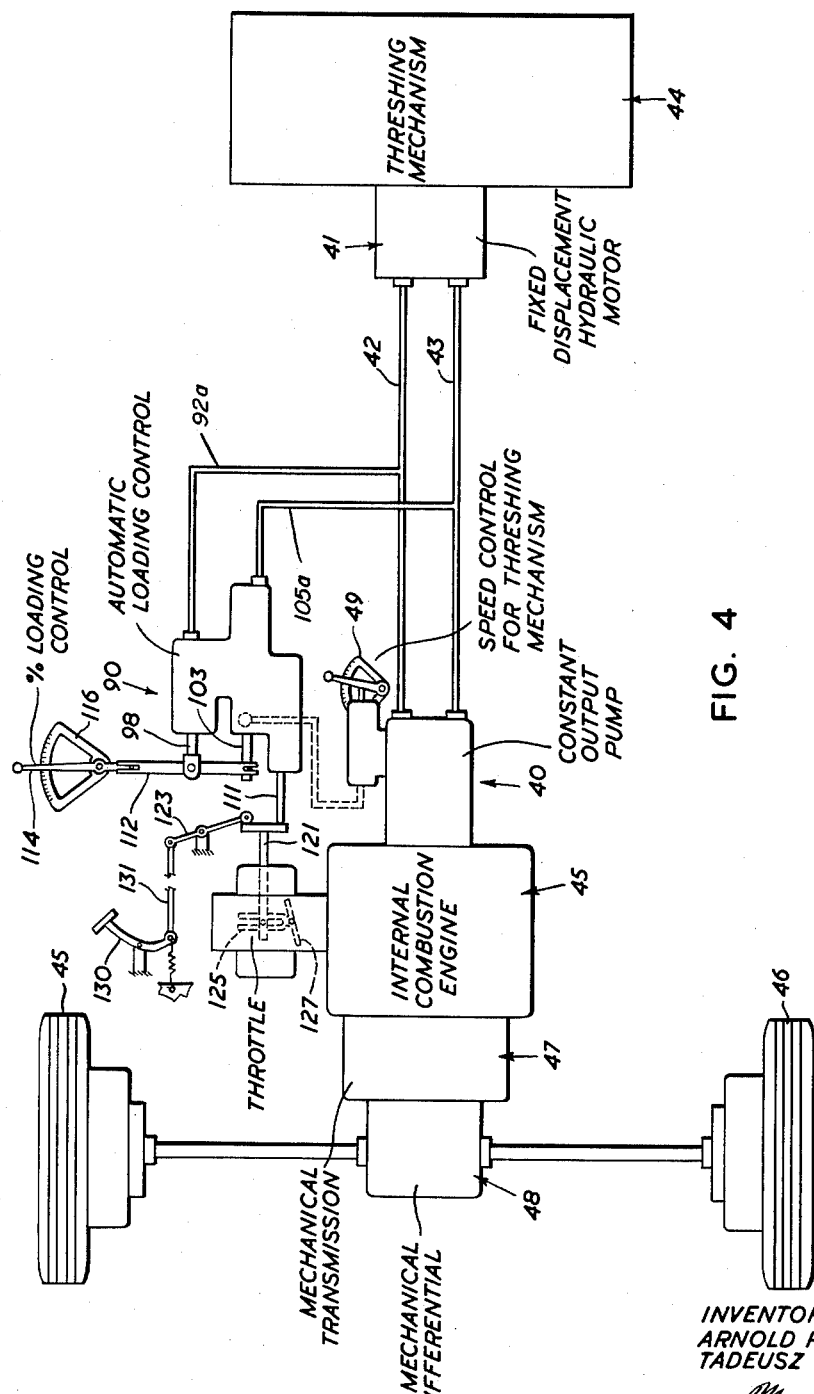
FIGURE 4 is a diagram showing the schematic arrangement of FIGURE 1 in greater detail, as applied to a threshing machine.

Referring now to FIGURE 4, which shows in greater detail the arrangement of FIGURE 1 as applied to a threshing machine. The first power transmission system comprises the servo-controlled, speed responsive pump indicated at 40, the fixed displacement hydraulic motor at 41, the hydraulic supply conduit at 42, and the return conduit at 43. The motor 41 drives a conventional threshing mechanism 44, which forms no part of the invention and is not described in detail. The servo-pump 40 is driven by a variable-speed internal combustion engine, indicated at 45, which additionally drives ground wheels 46 of the machine through a second power transmission system comprising a conventional mechanical transmission 47 and a conventional mechanical differential 48.

Associated with the servo-pump 40 is a control 49 by means of which the output of the servo-pump may be set at a determined constant delivery dependent on the speed at which it is desired to operate the threshing mechanism.

As will be appreciated, where the crop is of a kind in which the seeds to be harvested are easily fractured under impact, for example, peas or beans, it is necessary to operate the threshing mechanism at a relatively lower speed than that which may be employed for the threshing of wheat or barley which has little tendency to fracture under impact, and it is therefore necessary to provide such a speed control for the threshing mechanism to accommodate different crops.

The motor 41 is a fixed displacement motor, and therefore the quantity of hydraulic fluid supplied per unit time will determine the speed of revolution of the rotor of that motor. Thus, as the volumetric output of the servo-pump 40 is dependent on the setting of the control 49, the speed of operation of the motor 41 and of the threshing mechanism 44 will be maintained constant at any setting of the control 49 irrespective of changes of load or changes in speed of the engine 45.

Figure 5:
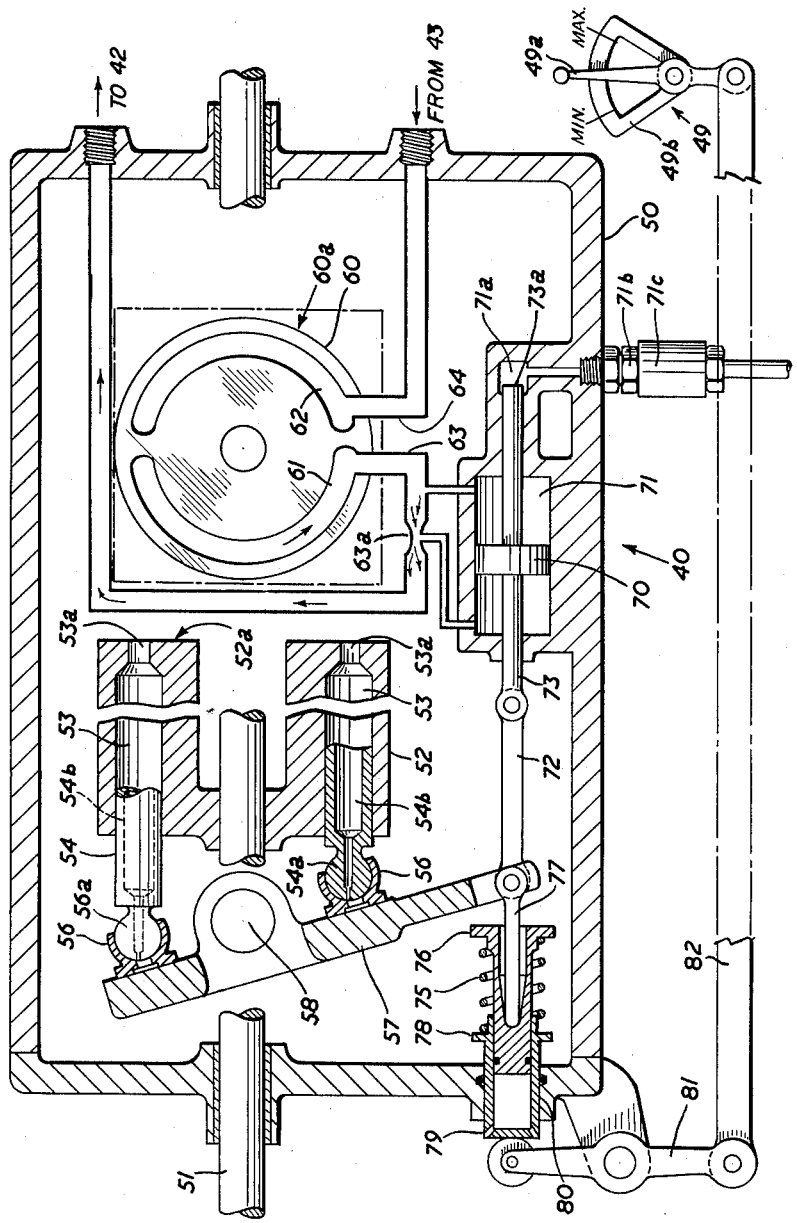
FIGURE 5 is a diagrammatic sectional view of a servo-controlled, speed responsive pump as used in the embodiment of FIGURE 4.

To enable a complete understanding to be had of the mode of operation and function of the servo-pump 40 and the control 49, reference is now made to FIGURE 5.

In FIGURE 5 the body of the servo-pump is indicated at 50, a driving rotor shaft of the servo-pump is indicated at 51, and a cylinder block of the servo-pump which is keyed to the shaft 51 is indicated at 52. The servo-pump 40 is of the swash-plate type hereinbefore referred to, and includes a plurality of bores 53 in the cylinder block which are axially aligned with the axis of rotation of the shaft 51 and of the block 52, and which each house a piston 54 which is reciprocable axially of the associated bore.

The pistons are biased outwardly of their respective bores by any convenient means, for example, by springs, and their ends protruding from the bores are each provided with a spherical end 54a on which a shoe 56 is slidable. The shoes 56 each have a recessed planar face, the recess of which is in communication with the interior of the associated bore 53 through a bore 54b of the piston, and the planar face of each shoe 56 rides on a planar face of a swash-plate 57 which is journalled for swinging movement about the axis of trunnions 58. The recesses and bore 54b are for the purpose of enabling the rubbing pressure of the shoes on the planar face to be hydrostatically balanced by the application of hydraulic pressure to the interior of the recesses.

By varying the angle of the swash-plate 57, the extent to which the pistons 54 are forced inwardly of their bores and are permitted to project from their bores is varied, thus enabling adjustment of the displacement of the pistons within the bores to be effected.

The cylinder block 52a at its end remote from the swash-plate 57 is provided with a planar face 52 which is in rubbing contact with a planar face 60a of a plate valve 60.

In FIGURE 5 the plate valve has been shown turned through 90° for the sake of clarity of illustration, and it will be understood that the planar faces 52a and 60a are in actuality arranged in intimate face-to-face contact. The plate valve has two arcuate grooves 61, 62 which are connected to a pressure supply conduit 63 and a return conduit 64, respectively, the bores 53 being placed in connection with the grooves 61, 62 by arcuate ports 53a of the cylinder block.

The construction of the servo-pump so far described is that of a conventional swash-plate pump, and operates in the following manner:

As the shaft 51 and cylinder block are rotated in a counterclockwise direction the shoes 56 traverse the planar face of the swash-plate and the pistons 54 sequentially move inwardly and outwardly axially of their respective bores while at the same time the bores 53 are sequentially connected to the supply groove 61 and return groove 62. The pistons are forced inwardly of their associated bores throughout the half revolution in which the shoes are riding up the inclined planar surface of the swashplate, during which time the ports 53a are in communication with the groove 61 to enable the pistons to express hydraulic fluid from the bore into the groove 61 and into the supply conduit 63. During the half revolution in which the shoes are riding down the inclined planar surface of the swash-plate and the ports 53a are in communication with the groove 62, the pistons are moved outwardly of their bores by their biasing means and the bores are recharged with hydraulic fluid.

By varying the angle of the swash-plate, it will be apparent that the length of travel of the pistons is varied, and thus the quantity of fluid expressed from the bores on each revolution of the shaft is varied, the output of the servo-pump being zero when the planar face of the swash-plate is normal to the axis of rotation of the shaft 51.

As will be apparent, the output of the servo-pump hereinbefore described is dependent exclusively on the speed of rotation of the shaft 51 and on the angle of the planar face of the swash-plate to the axis of the shaft, and, as the engine 45 is a variable speed engine, the output of the servo-pump so far described will vary with engine speed for any fixed swash-plate angle.

To maintain the output of the servo-pump at a determined constant irrespective of engine speed, a servo-control mechanism is provided which is under the direct control of the servo-pump output, the servo-control including a piston 70 operating in a cylinder 71, and a linkage 72 which provides a mechanical connection between a rod 73 of the piston and the swash-plate 57.

The swash-plate 57 is at all times biased towards its maximum swash angle (i.e. maximum output of the servo-pump) by a spring 75 which surrounds a plunger 76 and which reacts on the swash-plate through the intermediary of a floating push rod 77.

The swash-plate is moved towards its minimum swash angle (i.e. minimum output of the servo-pump) by a pressure differential existing across the piston 70 when the pump is operating, which differential is obtained by connecting the right-hand side of the cylinder in the drawings to the pressure supply conduit 63 upstream of a venturi constriction 63a, the left-hand side of the cylinder in the drawings being connected to a throat of the venturi constriction.

In use, the flow of hydraulic fluid through the conduit 63 is increased in velocity and thus reduced in pressure as it passes through the venturi constriction, resulting in a lower pressure being applied to the left-hand face of the piston 70 than to the right-hand face. The piston 70 is thus moved to the left in the drawings by the force exerted on the right-hand face of the piston 70 and against the bias of the spring 75 until the force exerted on the right-hand face by the fluid pressure is balanced by the combined forces exerted on the left-hand face of the piston by the fluid pressure and the spring 75.

During this movement the angle of the planar face of the swash-plate 57 to the axis of the shaft 51 is progressively decreased, and the output of the servo-pump is progressively decreased until a position of equilibrium is obtained in the system, at which time the output of the servo-pump remains constant for a determined speed of rotation of the shaft 51.

Any increase or decrease in the speed of rotation of the shaft 51 results in a momentary change in pressure upstream of the venturi constriction 63a and applied to the right-hand face of the piston 70, and the piston 70 is moved axially to the left or right by the resulting unbalance of forces until the opposed forces applied to it are again in balance, thus changing the angle of the planar surface of the swash-plate to bring the output of the servo-pump back to the determined constant.

Any increase or decrease in the back pressure in the supply conduit 63 is applied to both faces of the piston 70, with a result that there is no change in the balance of forces, and thus no change is effected to the angle of the swash-plate and the output of the servo-pump. If, however, the increase or decrease in load is sufficient to cause a change in engine speed, the servo-mechanism immediately functions as described above to maintain the output of the servo-pump at the determined constant.

An abutment for the spring 75 is provided by a radial flange 78 of the cylinder 79, which is axially slidable in a bore 80 of the servo-pump body 50. The cylinder 79 is adjusted axially in position by a lever 81 and linkage 82 under the direct control of the speed control 49, and when moved axially to the right in the drawings acts to further compress the spring 75 to increase the force acting on the left-hand face of the piston 70, and vice versa. The speed control 49 is of any convenient type, and may include a lever 49a which is movable across a quadrant 49b, any convenient mechanism being provided for maintaining the lever 49a in its selected angular position.

As will be appreciated, an increase in force applied to the left-hand face of the pistons 70 by the spring 75 results in the swash-plate being moved for its planar face to be at an increased angle to the axis of the shaft 51, with a result that the output of the servo-pump is increased, the mechanism then operating as previously described to maintain the output constant at the selected increased level. A decrease in force applied to the left-hand face of the piston 70 by the spring 75 results in a corresponding decrease in the output of the servo-pump, the mechanism then operating to maintain the output constant at the selected decreased level.

By the structure described above, the input of the hydraulic fluid to the motor 41 is maintained constant at a determined selected level, irrespective of changes in load imposed on the servo-pump 40 or of changes in speed of the variable speed engine 45. By operation of the speed control 49, the input to the hydraulic motor 41 can be selected to produce a determined speed of rotation of the threshing mechanism, which determined speed of operation will be maintained constant irrespective of changes of load applied to the threshing mechanism or of changes in speed of the engine 45.

The piston rod 73, at its right-hand end 73a in FIGURE 5, extends into a chamber 71a which may selectively be connected to a source of fluid pressure via a conduit 71b and a manually-operated control valve 71c. The fluid pressure may be derived from the output of the servo-pump or from a separate source, and when applied to the end of the piston rod 73a forcibly moves the piston 70 to the left against the bias of the spring 75 to move the swash-plate 57 to its position of minimum swash angle, i.e., zero output of the servo-pump.

In this way the drive to the threshing mechanism can be disconnected without stopping the prime mover 45, thus leaving the prime mover available for driving the ground wheels 46.

To maintain the load imposed on the threshing mechanism at a selected constant level within narrow limits, an automatic loading control is provided which includes the pressure sensing device and actuable means for controlling the speed of the ground wheels hereinbefore referred to. The effect of the control is to increase the speed of the ground wheels in the event that a decrease in load occurs in the threshing mechanism and vice versa.

The loading control is indicated diagrammatically at 90 in FIGURE 4 and is now described in detail with reference to FIGURE 6.

Figure 6:
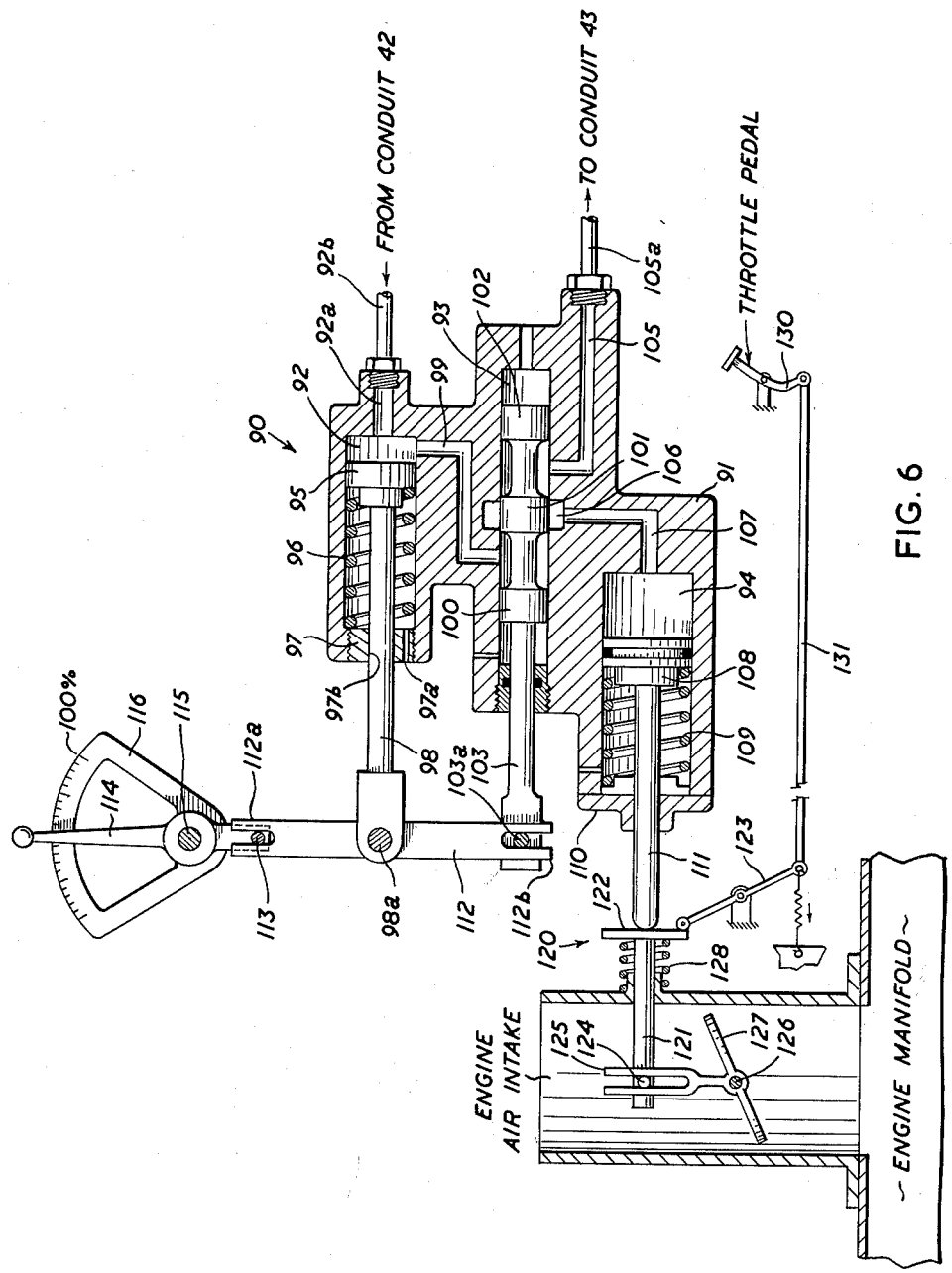
FIGURE 6 is a diagrammatic sectional view of the pressure sensing device and servo-control mechanism of FIGURE 4.

In FIGURE 6 the body of the control is indicated at 91, the body including a first bore 92, a second bore 93 having its axis parallel to that of the first bore, and a third bore 94.

The first bore 92 has an inlet 92a which is connected via a conduit 92b to the pressure supply conduit 42. The first bore contains a piston 95 which at all times is biased towards the inlet 92a by a spring 96, the spring 96 reacting against a plug 97 which closes the end of the bore 92 remote from the inlet 92a. The plug has a pressure relief opening 97a and a bore 97b in which a rod 98 is guided for axial sliding movement.

Leading from a position in the bore 92 adjacent the inlet 92a and into the second bore 93 is a passage 99. In the second bore 93 is an axially slidable spool valve 103 having three equally spaced lands 100, 101, and 102. The valve 103 normally occupies a central position in which the waist between the lands 100, 101 is in communication with the supply conduit 42 through the passage 99, and in which the waist between the lands 101, 102 is in communication with the return conduit 43 through a scavenge passage 105 and a conduit 105a. When the valve 103 is in a central position, its land 101 overlies a gallery 106 to isolate a passage 107 from the pressure passage 99 and from the scavenge passage 105. The passage 107 leads into the third bore 94 at one end thereof.

The bore 94 contains a piston 108 which is at all times biased towards the inlet end of the bore by a spring 109 reacting against a wall 110 providing a closure for the remote end of the bore. To the piston 108 is attached a piston rod 111 which extends through the end wall and which is guided for axial sliding movement therein.

A beam 112 is pivotally connected intermediate its ends to the piston rod 98 by a pin 98a for swinging movement in a plane which includes the longitudinal axis of the spool valve 103. The beam has an upper forked end 112a which engages a pin 113 of a control lever 114; the beam also has a lower forked end 112b which engages a pin 103a carried by the stem of the spool valve 103.

The lever 114 constitutes a "percentage loading" control and is pivoted intermediate its ends on a pin 115 of a quadrant 116, any convenient locking means being provided between the lever 114 and the quadrant 116 for holding the lever in a selected position of angular adjustment.

As will be appreciated, varying conditions of the crop, such as the case with which the grain or seed may be threshed out of the raw crop, the toughness of the stalks or haulms, the moisture content of the crop, and the proportion of grain or seed to roughage, will each have an effect on the rate of work and loading of the various components of the threshing mechanism, with a result that it is at times inefficient and dangerous to operate the mechanism at maximum load. This is the case also in other machines when too high a rate of work can result in damage to the tool. The percentage loading control is provided to enable the power input to the threshing mechanism to be set at a selected constant level dependent on the particular load characteristics.

The piston rod 111 acts directly on a throttle control 120 of the internal combustion engine 45, the throttle control including a rod 121 carrying a plate 122 against which the piston rod 111 and a lever 123 of a conventional manual throttle control react. The rod 121 carries a pin 124 which is engaged in a yoke 125 fast on shaft 126 of a butterfly valve 127, and is biased by a spring 128 in the direction of closure of the throttle.

The operation of the automatic loading control and percentage loading control will now be described. It should be noted that the various elements are illustrated in the drawings in the positions which they occupy when the threshing mechanism is operating under a constant load for the percentage loading determined by the setting of the lever 114.

Should now the load on the threshing mechanism increase, the increased hydraulic back pressure in the supply conduit 42 will be transmitted to the piston 95 through the conduit 92b, and will cause the piston to move towards the left, thus rocking the beam 112 in a clockwise direction about the axis of the pin 113. This in turn causes the spool valve 103 to be moved towards the left to provide a communication between the cylinder 94 and the scavenge line 43 via the passage 107, the gallery 106, the waist between the lands 101, 102, the passage 105, and the conduit 105a, permitting fluid to be expelled from the bore 94 as the piston 108 moves to the right under the load of spring 109. This permits the rod 121 to be moved by the spring 128, to cause the butterfly valve 127 to be rotated towards a position of maximum throttle closure, thus effecting a reduction in the speed of the engine 45. As the engine provides a direct drive for the ground wheels, the speed of the ground wheels is simultaneously reduced and the load imposed on the threshing mechanism is simultaneously reduced. This in turn results in a lowering of the back pressure in the supply conduit 42 and a commensurate lowering of the pressure in the bore 92, permitting the piston 95 to return towards its original position under the influence of its spring 96. The movement of the piston 95 effects a counter-clockwise rotation of the beam 112 to return the spool valve 103 to its central position where the gallery 106 is isolated from the passages 99 and 105; this in turn locks the piston 108 in its new position of adjustment, thus setting the speed of the engine and of the ground wheels at the requisite value where the load imposed on the threshing mechanism is the determined constant.

Should now the load on the threshing mechanism decrease, the decrease in hydraulic back pressure in the conduit 42, and thus in the bore 92, will permit the piston 95 to be moved towards the right by the spring 96, thus moving the spool valve 103 to the right to connect the bore 94 to the supply conduit 42 via the return conduit 92a, the bore 92, the passage 99, the waist between the lands 100, 101, and the passage 107 to move the piston 108 to the left against the bias of its spring, thus opening the throttle and increasing the engine speed and the speed of the ground wheels. As the load imposed on the threshing mechanism increases, the increase in conduit 42 will move piston 95 to the left, causing the spool 103 to move to the left to isolate the gallery 106 and to hold the piston 108 in its new position of adjustment.

In this way, any variation in load sensed at the threshing mechanism automatically is translated into a control signal in the form of the linear movement of the throttle control rod to effect a change in the speed of the ground wheels to return the load on the threshing mechanism to the constant determined by the setting of the lever 114.

To effect an increase in the percentage loading of the threshing mechanism the lever 114 is rotated in a clockwise direction, thus moving its pin 113 towards the left. As the piston 95 is locked in position by the balanced forces acting across it, the lever 112 will pivot about the pin 98a in a counter-clockwise direction to move the spool valve 103 to the right and connect the bore 94 to the supply conduit 42. This results in the piston 108 moving to the left to set the throttle for a higher engine speed and for a higher speed of the ground wheels with a consequence that the load imposed on the threshing mechanism is increased; the automatic control then takes over to maintain the load at the threshing mechanism at the newly selected value.

To reduce the percentage loading, the lever 114 is rotated in a counter-clockwise direction, thus effecting converse operation of the aforedescribed components.

By rotating the lever 114 to a maximum extent in a counter-clockwise direction, the percentage loading control is set for zero loading. The bore 94 will then be continuously in communication with the return conduit 43 via the waist between the lands 101 and 102 of the spool valve 103 and the piston 108 and its rod 111 will be moved to the maximum extent towards the right for the rod 111 to leave the plate 122. At this time the manual control constituted by the lever 123 and a throttle pedal 130 and the linkage 131 can be used exclusively to control the speed of the engine and of the ground wheels. This renders the automatic loading control and percentage loading control completely ineffectual, and the machine is exclusively under the control of the operator.

In the event that the control 71c is operated to disconnect the drive to the threshing mechanism, the pressure in the supply conduit 42 will drop to a minimum and the piston 95 will be moved to the right by the spring 96. This causes the beam 112 to be rotated in a counter-clockwise direction about the pivot 113, moving the valve 103 to the right for the gallery 106 to be placed in communication with the passage 105 and scavenge conduit 105a, thus permitting the piston 108 to be moved to the right to a maximum extent by the spring 109 for the piston rod 111 to leave the plate 122 and to place the machine exclusively under the manual control of the throttle pedal 130.

It will be appreciated that the throttle mechanism described above is given by way of illustration only of any of the commonly known and commonly available forms of throttle mechanism, and it will also be appreciated that the inter-connection between the piston rod 111 and the throttle control mechanism may take any desired form.

By the structure herein described is provided a machine in which the threshing mechanism (tool) is driven at a constant speed irrespective of changes in load at the threshing mechanism (tool) or of changes in speed of the engine, and in which the load imposed on the threshing mechanism (tool) automatically controls the ground speed (rate of feed of feed mechanism) of the machine to maintain the load at a constant determined by the setting of the percentage loading control.

The servo-pump, and the automatic loading control and percentage loading control described with reference to FIGURES 5 and 6 are common to each of the constructions of FIGURES 1 and 4, 2 and 3.

In the construction of FIGURE 2, the rod 111 of the control 90 of FIGURE 6 could provide the control signal which would be used to control the output of the variable output pump 27, the engine 21 of FIGURE 2, as previously mentioned being a constant speed engine provided with a suitable governing device (not shown) to maintain the engine at a constant r.p.m. regardless of the total load imposed upon it. Also, the variable output pump 27 of FIGURE 2 may be the servo-pump described with reference to FIGURE 5 with the sole modification that the cylinder 79 would be moved axially under the direct control of the piston rod 111 of FIGURE 6.

In application of the automatic loading control and percentage loading control of FIGURE 6 to the construction of FIGURE 3, the piston rod 111 could provide the control signal which would be employed to control a pressure reducing valve whereby the hydrostatic pressure supplied to the infinitely variable transmission 38 would be varied under the direct control of the rod 111.

In each of the arrangements of FIGURES 2 and 3, manual controls for the pump 27 and for the pressure reducing valve 37, respectively, would preferably be provided for the purpose of enabling the machines to be placed exclusively under manual control.

It will be appreciated that various changes may be made in the specific construction and arrangement of the various devices described above without departing from the scope of the invention as defined by the appended claims.

What we claim as our invention is:

1. In a machine having a driven tool which performs work on material fed to it, a feed mechanism for advancing the material and the tool relative to each other and thus feeding material to the tool, and a prime mover for the tool and for the driven feed mechanism; a first power transmission and control system comprising a transmission having a constant speed output and interposed in a drive to the tool to drive the tool at a constant speed irrespective of the speed of operation of the associated prime mover a second power transmission system interposed between the prime mover and the feed mechanism to drive the feed mechanism, a load-sensing device to measure solely the load on the tool and produce a control signal, said control signal being operative upon a device to control the rate at which the driven feed mechanism feeds material to the tool to maintain a substantially constant load on the tool.

2. In a machine having a driven tool which performs work on material fed to it, a feed mechanism for advancing the material and the tool relative to each other and thus feeding material to the tool, and a variable speed prime mover for the tool and for the driven feed mechanism; a first power transmission and control system comprising a transmission having a constant speed output and interposed in a drive to the tool to drive the tool at a constant speed irrespective of speed variations of the associated prime mover, a second power transmission system interposed between the prime mover and the feed mechanism to drive the feed mechanism, a load-sensing device to measure the load on the tool and produce a control signal, said control signal being operative upon a device to control the rate at which the driven feed mechanism feeds material to the tool to maintain a substantially constant load on the tool.

3. In a machine having a driven tool which performs work on material fed to it, a feed mechanism for advancing the material and the tool relative to each other and thus feeding material to the tool, and a constant speed prime mover for the tool and for the driven feed mechanism; a first power transmission and control system comprising a transmission having a constant speed output and interposed in a drive to the tool to drive the tool at a constant speed irrespective of the determined speed of operation of the associated prime mover, a load-sensing device to measure the load on the tool and produce a control signal, a second transmission interposed in a drive to the driven feed mechanism, the control signal of the load-sensing device being operative upon a device to control the variable speed transmission and hence to control the rate at which the feed mechanism feeds material to the tool to maintain a substantially constant load on the tool.

4. In a machine having a driven tool which performs work on material fed to it, a feed mechanism for advancing the material and the tool relative to each other and thus feeding material to the tool, and a prime mover for the tool and for the driven mechanism; a first power transmission and a control system comprising a hydrostatic transmission interposed between the tool and the associated prime mover, said hydrostatic transmission including a servo-controlled, speed-responsive pump driven by the associated prime mover and a fixed displacement hydraulic motor coupled to the said servo-controlled, speed responsive pump and driving the driven tool at a constant speed irrespective of the speed of operation of the associated prime mover, a second power transmission system interposed between the prime mover and the feed mechanism to drive the feed mechanism, a load-sensing device to measure the load on the tool and produce a control signal, said control signal being operative upon a device to control rate of feed of the driven feed mechanism to maintain a substantially constant load on the tool.

5. In a machine having a driven tool which performs work on material fed to it, a feed mechanism for advancing a material and the tool relative to each other and thus feeding material to the tool, and a prime mover for the tool and for the driven feed mechanism; a first power transmission and control system comprising a hydrostatic transmission interposed between the tool and the associated prime mover, said hydrostatic transmission including a servo-controlled, speed responsive pump driven by the associated prime mover, a fixed displacement hydraulic motor driving the driven tool, and a hydraulic circuit interconnecting the said servo-controlled, speed responsive pump and motor for the motor and tool to be driven at a constant speed irrespective of the speed of operation of the associated prime mover, a second power transmission system interposed between the prime mover and the feed mechanism to drive the feed mechanism, a pressure-sensing device to measure the pressure in the hydraulic circuit and produce a control signal, said control signal being operative upon a device to control rate of feed of the feed mechanism to maintain a substantially constant load on the tool.

6. In a machine having a driven tool which performs work on material fed to it, a feed mechanism for advancing the material and the tool relative to each other and thus feeding material to the tool, and a variable speed prime mover for the tool and for the driven feed mechanism; a first power transmission and control system comprising a hydrostatic transmission interposed between the tool and the associated prime mover, said hydrostatic transmission including a servo-controlled, speed responsive pump driven by the associated prime mover, a fixed displacement hydraulic motor driving the driven tool, and a hydraulic circuit interconnecting the pump and the motor for the motor to be driven at a constant speed irrespective of speed variations of the associated prime mover, a second power transmission system interposed between the prime mover and the feed mechanism to drive the feed mechanism, a pressure-sensing device to measure the pressure in the hydraulic circuit and produce a control signal, said control signal being operative upon a device to reduce the rate of feed of the driven feed mechanism in response to a rise in pressure sensed by the pressure-sensing device to maintain a substantially constant load on the tool.

7. In a machine having a driven tool which performs work on material fed to it, feed mechanism for advancing the material and the tool relative to each other and thus feeding material to the tool, and a constant speed prime mover for the tool and for the driven mechanism; a first power transmission and control system comprising a hydrostatic transmission interposed between the machine tool and the associated prime mover, said hydrostatic transmission including a servo-controlled, speed responsive pump driven by the associated prime mover, a fixed displacement hydraulic motor driving the driven tool, and a hydraulic circuit interconnecting the pump and the motor for the motor to be driven at a constant speed irrespective of the determined speed of operation of the associated prime mover, a pressure-sensing device to measure the pressure in the hydraulic circuit and produce a control signal, a variable ratio step-down second transmission interposed between the feed mechanism and the associated prime mover to drive the feed mechanism, and means responsive to the control signal and operative upon a device of the step-down transmission to increase the step-down ratio of said transmission in response to a rise in pressure sensed by the sensing device and hence reduce the rate of feed of the feed mechanism to maintain a substantially constant load on the tool.

8. In a machine having a driven tool which performs work on material fed to it, a feed mechanism for advancing the material and the tool relative to each other and thus feeding material to the tool, and a constant speed prime mover for the tool and for the driven mechanism; a first power transmission and control system comprising a hydrostatic transmission interposed between the machine tool and the associated prime mover, said hydrostatic transmission including a servo-controlled, speed ressponsive pump driven by the associated prime mover, a fixed displacement hydraulic motor driving the driven tool, and a hydraulic circuit interconnecting the pump and the motor for the motor to be driven at a constant speed irrespective of the determined speed of operation of the associated prime mover, a pressure-sensing device to measure the pressure in the hydraulic circuit and produce a control signal, a second power transmission system for the feed mechanism including a variable displacement pump driven by the associated prime mover and a fixed displacement motor driving the driven feed mechanism, and a hydraulic circuit interconnecting the pump and motor, and means responsive to the control signal produced by the pressure-sensing device and operative upon a device of the variable displacement pump to decrease the output of said pump in response to a rise in pressure sensed by the pressure-sensing mechanism to reduce the rate of feed of the feed mechanism and maintain a substantially constant load on the tool.

9. A machine having a driven tool and a mechanism for feeding material to said tool, including in combination, drive means for the tool and drive means for the driven feed mechanism, a hydrostatic transmission in the drive means to said tool, said transmission including a servo-controlled, speed responsive hydraulic pump and a hydraulic motor connected to be driven by said pump through conduits of a hydraulic circuit of said transmission and connected to drive said tool at a constant speed, a pressure sensing means in the hydraulic circuit of said transmission to sense the pressure in the circuit and to produce a control signal, and means actuated by said control signal and operative upon the drive means to said feed mechanism for decreasing the rate at which said feed mechanism feeds material to the tool in selected ratio to an increase in pressure sensed in said hydraulic circuit by said pressure sensing means.

10. A machine having a mechanism for feeding material to a tool driven from a prime mover, including in combination a hydrostatic transmission comprising a servo-controlled, speed responsive hydraulic pump driven by said prime mover and a hydraulic motor connected to be driven by said pump through conduits of a hydraulic circuit and connected to drive said tool, pressure sensing means associated with the hydraulic circuit of said transmission to sense the pressure in the hydraulic circuit and produce a control signal, a second transmission connected to be driven from said prime mover and connected to drive said feed mechanism, and means actuated by said control signal for decreasing the rate at which said feed mechanism feeds material to the tool in selected ratio to an increase in pressure sensed in said hydraulic circuit by said pressure sensing means.

11. In a machine having a driven tool upon which a load is imposed by material fed to the tool by a driven feed mechanism, means for maintaining the load on the tool at a substantially constant level including in combination; a hydrostatic transmission to be interposed in a drive to said tool, said transmission including a servo-controlled, speed responsive hydraulic pump to be driven by a prime mover, a hydraulic motor connected to be driven by said pump through conduits of a hydraulic circuit of said transmission to drive said tool, pressure sensing means in the hydraulic circuit of said transmission to sense the pressure in the hydraulic circuit and produce a control signal, the control signal being operative to control the speed of operation of a drive to said feed mechanism for decreasing the rate at which said feed mechanism feeds material to the tool in selected ratio to an increase in pressure sensed in said hydraulic circuit by said pressure sensing means and means for selecting the level of the load which is to be maintained constant at the tool.

12. In a machine having a driven tool upon which a load is imposed by material fed to the tool by a driven feed mechanism, means for maintaining the load on the tool at a substantially constant level including in combination; a hydrostatic transmission driven by a prime mover and connected to drive said tool, said transmission including a servo-controlled, speed responsive hydraulic pump driven by the prime mover and a hydraulic motor driven by said pump through conduits of a hydraulic circuit of said transmission and connected to drive said tool, pressure sensing means in the hydraulic circuit of said transmission to sense the pressure in the hydraulic circuit and produce a control signal, said control signal being operative to control the rate of feed of said feed mechanism to decrease the rate at which said feed mechanism feeds material to the tool in selected ratio to an increase in pressure sensed in said hydraulic circuit by said pressure sensing means and means whereby the level of the load at the tool may be selected at any value which is to be maintained constant.

References Cited in the file of this patent

UNITED STATES PATENTS

| | | |
|---|---|---|
| 2,528,275 | Heth | Oct. 31, 1950 |
| 2,639,569 | Pasturczak | May 26, 1953 |
| 2,917,897 | Shaffer | Dec. 22, 1959 |
| 2,942,421 | Hann et al. | June 28, 1960 |

FOREIGN PATENTS

| | | |
|---|---|---|
| 489,791 | Great Britain | Aug. 4, 1938 |